Dec. 11, 1928.  1,695,248
T. A. CROMPTON
PRESSURE RELIEVING VALVE
Filed Jan. 27, 1928
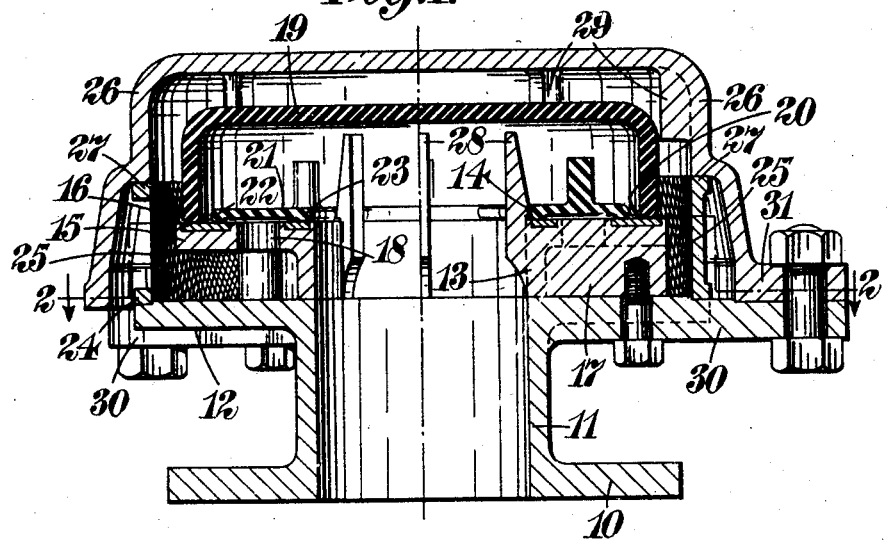
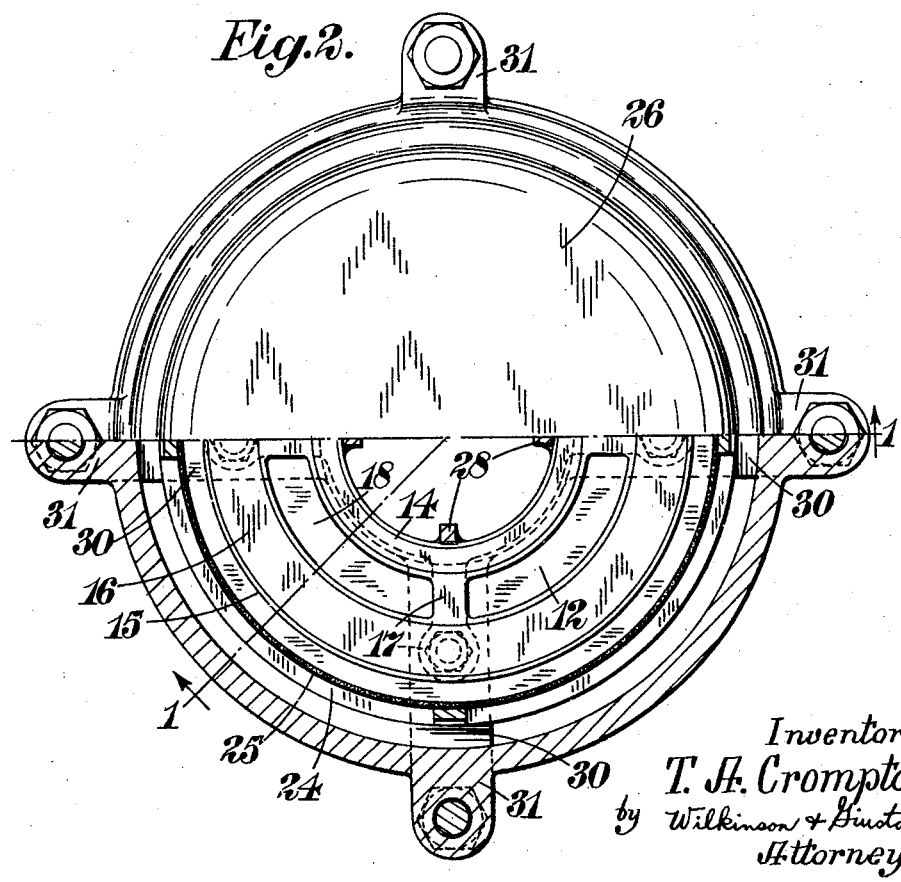
Inventor
T. A. Crompton
by Wilkinson & Huota
Attorneys.

Patented Dec. 11, 1928.

1,695,248

UNITED STATES PATENT OFFICE.

THOMAS ALBERT CROMPTON, OF ILFORD, ENGLAND.

PRESSURE-RELIEVING VALVE.

Application filed January 27, 1928, Serial No. 249,951, and in Great Britain August 3, 1927.

This invention is for improvements in or relating to valves for relieving pressure in a closed chamber, which valves are of the type in which a bell-shaped valve is lifted from its closed to its open position by the pressure which is to be relieved, the weight of the valve and the area of it exposed to pressure being adjusted or predetermined according to the maximum permissible pressure in the chamber, and in which the bell-shaped valve is arranged to move freely.

A valve of this type has been proposed in which the seating of the bell-shaped valve is constituted by a liquid or equivalent seal (e. g. mercury or other liquid or fine dry sand).

According to this invention a pressure-relieving valve of the type specified above comprises a felt ring whereon the bell-shaped valve seats itself. The valve casing may be formed or provided with a guide or guides for aligning the bell-shaped valve over the felt ring. The term "felt" is herein meant to include not only felt but also any other similar material which is not easily injured by the valves or affected by the contents of the chamber.

The invention may also be applied to double-acting relief-valves which will open to relieve the pressure in a chamber whereon they are used, or will open if the pressure in the chamber falls below atmospheric pressure, so as to maintain the chamber always substantially at atmospheric pressure; the invention also comprises, therefore, a pressure-relieving and anti-vacuum or the like valve (hereinafter termed a double-acting relief-valve), for a closed chamber comprising a pressure-relieving valve as hereinbefore specified, an annular inverted channel-shaped valve inside the bell-shaped valve, the outer lower edge whereof also seats itself on the felt or like ring, a second felt or like ring concentrically disposed within and in the same plane as the first felt ring and constituting the seating for the inner lower edge of the annular valve, and a passage or passages between the felt rings to place the lower side of the annular ring in communication with the atmosphere.

An embodiment of the invention will now be described by way of example only, with the aid of the accompanying drawing, in which—

Figure 1 is a section along the line 1—1 of Figure 2 of a double-acting relief-valve according to this invention, and Figure 2 is a part sectional plan along the line 2—2 of Figure 1.

The base of the valve is suitably shaped for attachment to the tank or chamber whereon it is used, comprising, for example, a flange 10 with suitable bolt-holes in it, this flange surrounding an upstanding tubular portion 11. At the upper end of this portion there is provided a horizontal flange 12. The tubular portion is continued by an annular member 13 formed with an annular channel in which is inserted a ring 14 of felt or the like material. Surrounding this member 13 is a second annular flange 15 which is formed with a channel wherein there is inserted a ring 16 of felt or the like material. The flange 15 is supported from the member 13 by ribs 17 so as to provide openings 18 between the flange 15 and the member 13. The ribs 17 extend downwards to the flange 12 and constitute lugs by means of which the member 13 is bolted to the flange 12.

The valves are constituted by an inverted cup or bell 19 whereof the lower edge 20 is seated adjacent the outer edge of the felt ring 16 and by a second annular member 21, this member (hereinafter referred to as a bell) being constituted by an inverted-channel-sectioned annular member whereof the lower edges 22, 23 seat themselves adjacent the inner edge of the ring of felt 16 and on the ring of felt 14 respectively.

Surrounding the flange 15 aforesaid there is a suitable cylindrical frame 24 covered with wire gauze 25, and a storm-proof cover 26 which is formed with an internal rib 27 whereby it is seated on the top of the frame 24.

The flange 12 is formed with four radial ribs 30 extending beyond its periphery; and the cover 26 bolted to the ends of the ribs 30 by means of four lugs 31 formed on it.

The member 13 has formed on it four upstanding guides 28 which do not restrict the lifting of the bell 21 but serve to align it over the felt rings 14 and 16; the cover 26 is formed with six guides 29 which in a similar manner align the bell 19 over the felt ring 16, but any suitable number of guides may be used.

When the valve is secured on a tank, communication is provided from the interior of the tank through the parts 11, 13 to the interior of the bell 19 and to the exterior of the bell 21. Communication is also provided from atmosphere through the space of the lower edge of the cover 26 and the edge of the flange 12, through the gauze 30 to the space above the bell 19 and also under the flange 15 to the space below the bell 21.

Communication can be established between the interior of the tank and the atmosphere in two ways, first by lifting the bell 19 from its seating, when communication is by way of the interior of that bell to outside it and through the gauze screen 25 to atmosphere, or, alternatively, by lifting the valve 21 from its seat, when the communication takes place through the interior of that valve, through the openings 18 and the gauze screen 25 to atmosphere. It will be seen that in either case communication takes place through the gauze screen 25 and as it is a fireproof screen the contents of the tank are effectively safeguarded at all times against fire. It will be noted that the interior of the bell 19 is exposed to the pressure existing inside the chamber whilst the outside is exposed to atmospheric pressure; the weight of the bell is adjusted or predetermined with relation to its area so that it will be lifted upon its seat by a pressure difference equal to the maximum permissible pressure in the tank, and similarly the bell 21 is designed to be lifted by atmospheric pressure when the pressure within the tank falls to the minimum permissible limit below atmosphere.

The bells 19 and 21 may be made of metal or of any other desired material, suitable as regards weight to relieve the pressure or vacuum desired, and also as regards composition, to resist corrosion by any of the gases evolved from oils, petrol or other liquids such as are stored in the tanks.

I claim:—

1. A double-acting relief-valve for a closed chamber, comprising in combination a pressure-relieving valve of the type specified and provided with a felt ring on which the bell-shaped valve seats itself, an annular inverted channel-shaped valve inside the bell-shaped valve, the outer lower edge whereof also seats itself on the felt ring aforesaid, a second felt ring concentrically disposed within and in the same plane as the first felt ring and constituting the seating for the inner lower edge of the annular valve, and a passage between the felt rings to place the lower side of the annular ring in communication with the atmosphere.

2. A double-acting relief-valve for a closed chamber, comprising in combination a pressure-relieving valve of the type specified having a valve-casing provided with means for aligning the bell-shaped valve over a felt ring on which the said valve seats itself, an annular inverted channel-shaped valve inside the bell-shaped valve, the outer lower edge whereof also seats itself on the felt ring aforesaid, a second felt ring concentrically disposed within and in the same plane as the first felt ring and constituting the seating for the inner lower edge of the annular valve, and a passage between the felt rings to place the lower side of the annular ring in communication with the atmosphere.

3. A double-acting relief-valve for a closed chamber, comprising in combination a pressure-relieving valve of the type specified and provided with a felt ring on which the bell-shaped valve seats itself, an annular inverted channel-shaped valve inside the bell-shaped valve, the outer lower edge whereof also seats itself on the felt ring aforesaid, a second felt ring concentrically disposed within and in the same plane as the first felt ring and constituting the seating for the inner lower edge of the annular valve, a passage between the felt rings to place the lower side of the annular ring in communication with the atmosphere, and means for aligning the annular valve over the felt rings.

4. A double-acting relief-valve for a closed chamber, comprising in combination a pressure-relieving valve of the type specified having a valve-casing provided with means for aligning the bell-shaped valve over a felt ring on which the said valve seats itself, an annular inverted channel-shaped valve inside the bell-shaped valve, the outer lower edge whereof also seats itself on the felt ring aforesaid, a second felt ring concentrically disposed within and in the same plane as the first felt ring and constituting the seating for the inner lower edge of the annular valve, a passage between the felt rings to place the lower side of the annular ring in communication with the atmosphere, and means for aligning the annular valve over the felt rings.

In testimony whereof I affix my signature.

THOMAS ALBERT CROMPTON.